(12) United States Patent
Itano

(10) Patent No.: US 10,841,519 B2
(45) Date of Patent: Nov. 17, 2020

(54) PHOTOELECTRIC CONVERSION APPARATUS, EQUIPMENT, AND DRIVING METHOD OF PHOTOELECTRIC CONVERSION APPARATUS

(71) Applicant: CANON KABUSHIKI KAISHA, Tokyo (JP)

(72) Inventor: Tetsuya Itano, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 50 days.

(21) Appl. No.: 16/183,767

(22) Filed: Nov. 8, 2018

(65) Prior Publication Data
US 2019/0141266 A1    May 9, 2019

(30) Foreign Application Priority Data

Nov. 9, 2017 (JP) ................................. 2017-216550

(51) Int. Cl.
*H04N 5/359* (2011.01)
*H04N 5/3745* (2011.01)
*H04N 5/378* (2011.01)

(52) U.S. Cl.
CPC ......... *H04N 5/3591* (2013.01); *H04N 5/3594* (2013.01); *H04N 5/378* (2013.01); *H04N 5/3745* (2013.01); *H04N 5/37457* (2013.01)

(58) Field of Classification Search
CPC .... H04N 5/378; H04N 5/3745; H04N 5/3591; H04N 5/3594; H04N 5/37457; H01L 27/14603; H01L 27/1461; H01L 27/1464; H01L 27/14645
See application file for complete search history.

(56) References Cited

U.S. PATENT DOCUMENTS

| 7,321,110 B2 | 1/2008 | Okita et al. |
| 7,460,162 B2 | 12/2008 | Koizumi et al. |
| 7,462,810 B2 | 12/2008 | Kobayashi et al. |
| 7,550,793 B2 | 6/2009 | Itano et al. |

(Continued)

FOREIGN PATENT DOCUMENTS

| JP | 2007-124372 A | 5/2007 |
| JP | 2008-199101 A | 8/2008 |

(Continued)

OTHER PUBLICATIONS

U.S. Appl. No. 16/198,520, filed Nov. 21, 2018 (First Named Inventor: Kazuhiro Saito).

*Primary Examiner* — Antoinette T Spinks
(74) *Attorney, Agent, or Firm* — Venable LLP

(57) ABSTRACT

A photoelectric conversion apparatus including pixels is provided. Each pixels comprises a photoelectric converter, a floating diffusion, a transfer transistor between the photoelectric converter and the floating diffusion, a reset transistor resetting the floating diffusion, and an amplification transistor outputting a signal from the pixel to a signal line. An accumulation period includes, sequentially, a first period supplying a first voltage to a gate of the reset transistor, a second period supplying a second voltage to the gate, and a third period supplying a third voltage to set the reset transistor to the OFF to the gate. The first voltage is a voltage that falls between the second voltage and the third voltage, the second period is started before the signal is output, and the second period is longer than the third period.

18 Claims, 11 Drawing Sheets

(56) References Cited

U.S. PATENT DOCUMENTS

| | | |
|---|---|---|
| 7,719,587 B2 | 5/2010 | Ogura et al. |
| 7,741,593 B2 | 6/2010 | Iwata et al. |
| 7,825,974 B2 | 11/2010 | Itano et al. |
| 7,982,789 B2 | 7/2011 | Watanabe et al. |
| 8,023,025 B2 | 9/2011 | Itano et al. |
| 8,081,245 B2 | 12/2011 | Itano et al. |
| 8,085,319 B2 | 12/2011 | Ono et al. |
| 8,159,577 B2 | 4/2012 | Iwata et al. |
| 8,289,431 B2 | 10/2012 | Itano |
| 8,363,137 B2 | 1/2013 | Sonoda et al. |
| 8,400,546 B2 | 3/2013 | Itano et al. |
| 8,598,901 B2 | 12/2013 | Hiyama et al. |
| 8,711,259 B2 | 4/2014 | Maehashi et al. |
| 8,836,838 B2 | 9/2014 | Nakamura et al. |
| 8,928,786 B2 | 1/2015 | Iwata et al. |
| 9,029,752 B2 | 5/2015 | Saito et al. |
| 9,083,906 B2 | 7/2015 | Nakamura et al. |
| 9,232,165 B2 | 1/2016 | Saito et al. |
| 9,288,415 B2 | 3/2016 | Yamazaki et al. |
| 9,438,828 B2 | 9/2016 | Itano et al. |
| 9,661,247 B2 | 5/2017 | Inui |
| 9,860,462 B2 * | 1/2018 | Inui .................. H01L 27/14612 |
| 10,511,791 B2 * | 12/2019 | Kobayashi ......... H04N 5/23209 |
| 2008/0192135 A1 | 8/2008 | Yamashita |
| 2011/0013065 A1 | 1/2011 | Shinohara |
| 2011/0316839 A1 * | 12/2011 | Minowa ................. H04N 5/355 |
| | | 345/211 |
| 2014/0085521 A1 * | 3/2014 | Inui ..................... H04N 5/3742 |
| | | 348/301 |
| 2016/0227141 A1 | 8/2016 | Kobayashi et al. |
| 2016/0277690 A1 * | 9/2016 | Inui ..................... H04N 5/3745 |
| 2017/0223289 A1 * | 8/2017 | Inui ....................... H04N 5/378 |
| 2017/0353674 A1 * | 12/2017 | Kobayashi ............. H04N 5/243 |
| 2018/0048839 A1 * | 2/2018 | Mori .................. H01L 27/1461 |
| 2018/0097960 A1 | 4/2018 | Ochiai et al. |
| 2018/0098012 A1 | 4/2018 | Takado et al. |
| 2018/0184031 A1 | 6/2018 | Morita et al. |
| 2018/0197907 A1 | 7/2018 | Wada et al. |
| 2018/0213219 A1 | 7/2018 | Kono et al. |

FOREIGN PATENT DOCUMENTS

| | | |
|---|---|---|
| JP | 2011-023590 A | 2/2011 |
| JP | 2016-178408 A | 10/2016 |

* cited by examiner

PHOTOELECTRIC CONVERSION APPARATUS, EQUIPMENT, AND DRIVING METHOD OF PHOTOELECTRIC CONVERSION APPARATUS

BACKGROUND OF THE INVENTION

Field of the Invention

The present invention relates to a photoelectric conversion apparatus, an equipment, and a driving method of photoelectric conversion apparatus.

Description of the Related Art

In a photoelectric conversion apparatus, there is known a phenomenon called blooming in which charges of a pixel overflow to another pixel after a photoelectric converter of the pixel has become saturated. If the charges that overflowed from the photoelectric converter of the saturated pixel flow into another pixel, a pseudo signal is created, and the quality of an image to be obtained is degraded. Japanese Patent Laid-Open No. 2016-178408 discloses an image sensing apparatus that suppresses image quality degradation due to blooming by supplying, to a transistor that resets the potential of a floating diffusion portion, a voltage corresponding to a voltage that falls between an ON-state voltage and an OFF-state voltage of the transistor, while a photoelectric conversion element accumulates charges.

SUMMARY OF THE INVENTION

If a low voltage is supplied to a control electrode of a reset transistor while a photoelectric converter is accumulating charges, there is a possibility that blooming will not be sufficiently suppressed because the potential of a floating diffusion portion will not be sufficiently high.

Some embodiments of the present invention provide a technique advantageous in suppressing blooming.

According to some embodiments, a photoelectric conversion apparatus that includes a plurality of pixels and a readout circuit, wherein each of the plurality of pixels comprises a photoelectric converter, a floating diffusion portion, a transfer transistor configured to transfer charges generated in the photoelectric converter to the floating diffusion portion, a reset transistor configured to reset a potential of the floating diffusion portion, and an amplification transistor configured to output a signal based on the potential of the floating diffusion portion to a signal line, an accumulation period in which charges are accumulated in the photoelectric converter by setting the transfer transistor to an OFF state includes, sequentially, a first period in which a first voltage is supplied to a gate of the reset transistor, a second period in which a second voltage is supplied to the gate of the reset transistor, and a third period in which a third voltage to set the reset transistor to the OFF state is supplied to the gate of the reset transistor, the first voltage is a voltage that falls between the second voltage and the third voltage, the supplying of the second voltage in the second period is started before the signal is output from the amplification transistor to the signal line, and a time in which the second voltage is supplied in the second period is longer than a time in which the third voltage is supplied in the third period, is provided.

According to some other embodiments, a method of driving a photoelectric conversion apparatus that includes a plurality of pixels, wherein each of the plurality of pixels comprises a photoelectric converter, a floating diffusion portion, a transfer transistor configured to transfer charges generated in the photoelectric converter to the floating diffusion portion, a reset transistor configured to reset a potential of the floating diffusion portion, and an amplification transistor configured to output a signal based on the potential of the floating diffusion portion to a signal line, an accumulation period in which charges are accumulated in the photoelectric converter by setting the transfer transistor to an OFF state includes, sequentially, a first period in which a first voltage is supplied to a gate of the reset transistor, a second period in which a second voltage is supplied to the gate of the reset transistor, and a third period in which a third voltage to set the reset transistor to the OFF state is supplied to the gate of the reset transistor, the first voltage is a voltage that falls between the second voltage and the third voltage, the supplying of the second voltage in the second period is started before the signal is output from the amplification transistor to the signal line, and a time in which the second voltage is supplied in the second period is longer than a time in which the third voltage is supplied in the third period, is provided.

Further features of the present invention will become apparent from the following description of exemplary embodiments (with reference to the attached drawings).

DESCRIPTION OF THE EMBODIMENTS

Figure 1:
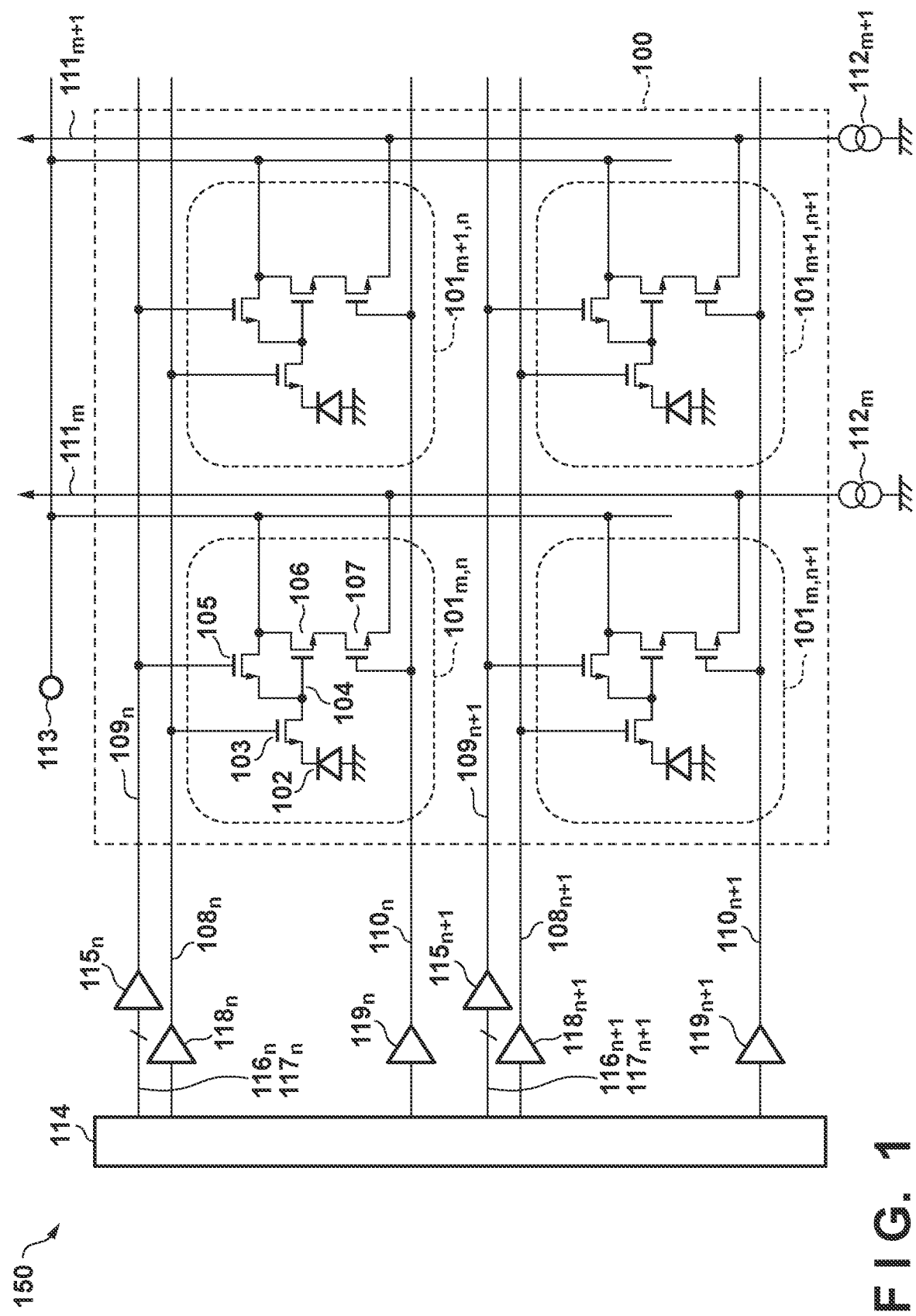
FIG. 1 is a circuit diagram showing an example of the arrangement of pixels of a photoelectric conversion apparatus according to an embodiment of the present invention.

A detailed embodiment of a photoelectric conversion apparatus according to the present invention will now be described with reference to the accompanying drawings. Note that in the following description and drawings, common reference numerals denote common components throughout a plurality of drawings. Hence, the common components will be described by cross-reference to the plurality of drawings, and a description of components denoted by common reference numerals will be appropriately omitted.

Figure 2:
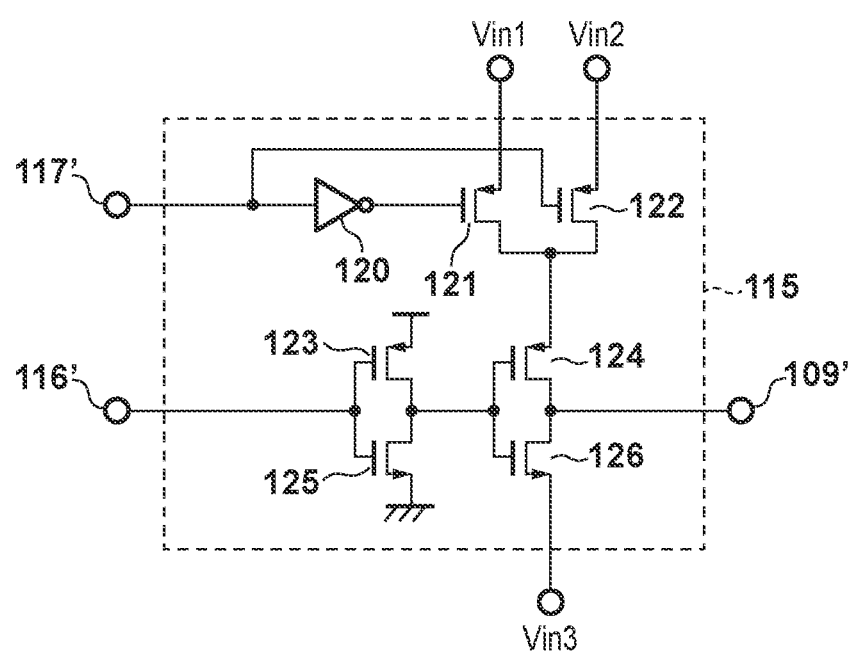
FIG. 2 is a circuit diagram showing an example of the arrangement of a reset control circuit of a pixel of the photoelectric conversion apparatus of FIG. 1.

The arrangement and the driving method of a photoelectric conversion apparatus according to an embodiment of the present invention will be described with reference to FIGS. 1 to 7. FIG. 1 is a circuit diagram showing an example of the arrangement of pixels in a photoelectric conversion apparatus 150 according to the first embodiment of the present invention, and FIG. 2 is a circuit diagram showing an example of the arrangement of each reset control circuit 115 for resetting corresponding reset transistors 105 of the photoelectric conversion apparatus 150.

The structure of the photoelectric conversion apparatus 150 will be described first with reference to FIGS. 1 and 2. The photoelectric conversion apparatus 150 according to this embodiment includes, as shown in FIG. 1, an image sensing region 100 in which a plurality of pixels 101 are two-dimensionally arrayed in a row direction and a column direction. Of the plurality of pixels 101 that form the image sensing region 100, only four pixels 101 positioned in an nth row and an (n+1)th row of an mth column and the nth row and the (n+1)th row of an (m+1)th column are shown in FIG. 1. In FIG. 1, a pixel $101_{m,\,n}$ represents the pixel 101 belonging to the mth column and the nth row.

Each pixel 101 includes a photoelectric converter 102, a transfer transistor 103, the reset transistor 105, an amplification transistor 106, and a selection transistor 107. The anode of the photoelectric converter 102 which is a photodiode is connected to a ground voltage, and the cathode of the photoelectric converter 102 is connected to the source of the transfer transistor 103. The drain of the transfer transistor 103 is connected to the source of the reset transistor 105 and the gate of the amplification transistor 106. The drain of the transfer transistor 103, the source of the reset transistor 105, and the connection node of the gate of the amplification transistor 106 form a floating diffusion portion 104. The drain of the reset transistor 105 and the drain of the amplification transistor 106 are connected to a power source voltage line 113. The source of the amplification transistor 106 is connected to the drain of the selection transistor 107.

The photoelectric conversion apparatus 150 includes a vertical scanning circuit 114 that forms a readout circuit. A transfer gate control line 108, a reset gate control line 109, and a row selection control line 110 which are connected to the vertical scanning circuit 114 and extend in the row direction are provided for each row of the pixel 101 arranged in the image sensing region 100. In FIG. 1, for the sake of descriptive convenience hereinafter, a suffix n or n+1 corresponding to a row number in the image sensing region 100 has been added to each control line as a reference symbol. The transfer gate control line 108, reset gate control line 109, and the row selection control line 110 are common signal lines for the pixels 101 arrayed in the row direction. The transfer gate control line 108 is connected to the gate of the transfer transistor 103 of each of the plurality of pixels 101 belonging to a corresponding row. Each transfer gate control line 108 is connected to the vertical scanning circuit 114 via a buffer 118. The reset gate control line 109 is connected to the gate of the reset transistor 105 of each of the plurality of pixels 101 belonging to the corresponding row. Each reset gate control line 109 is connected to the vertical scanning circuit 114 via the reset control circuit 115 and a plurality of control lines 116 and 117. The row selection control line 110 is connected to the gate of the selection transistor 107 of each of the plurality of pixels 101 belonging to the corresponding row. Each row selection control line 110 is connected to the vertical scanning circuit 114 via a buffer 119.

A vertical output line 111 extending in the column direction has been arranged for each column of the pixels 101 arranged in the image sensing region 100. In FIG. 1, for the sake of descriptive convenience hereinafter, a suffix m or m+1 corresponding to a column number in the image sensing region 100 has been added to each vertical output line 111 as a reference symbol. The vertical output line 111 is connected to the source of the selection transistor 107 of each of the pixels 101 arrayed in the column direction and forms a common signal line for these pixels 101. A corresponding constant current source 112 and a column readout circuit (not shown) which forms a readout circuit together with the vertical scanning circuit 114 are connected to each vertical output line 111.

The photoelectric converter 102 generates signal charges corresponding to the amount of incident light. The transfer transistor 103 transfers the charges which were generated and accumulated in the photoelectric converter 102 to the floating diffusion portion 104. The floating diffusion portion 104 is formed from the junction capacitance of a well and the parasitic capacitances of elements including the insulating film capacitance of a gate electrode such as the transfer transistor 103 or the like, and the floating diffusion portion converts the charges transferred via the transfer transistor 103 into a voltage corresponding to the amount of the charges. The reset transistor 105 is a switch that is used to set the floating diffusion portion 104 to a predetermined potential which is used as a reference to obtain a signal voltage level. In general, a power source voltage is used as the predetermined potential, and the dynamic range is ensured by increasing the range of the operation voltage for signal output in the floating diffusion portion 104. In this specification, the power source voltage to be used to reset the floating diffusion portion 104 may be referred to as a reset power source voltage. The amplification transistor 106 outputs a signal corresponding to the amount of charges accumulated in the floating diffusion portion 104 to the corresponding vertical output line 111 which serves as the signal line. The selection transistor 107 selects the pixel 101 which is to output (to undergo readout of) the signal corresponding to the amount of charges accumulated in the floating diffusion portion 104, that is, controls the connection between the amplification transistor 106 and the corresponding vertical output line 111 which serves as the signal line. When a pixel signal is to be read out from each pixel 101 of the image sensing region 100, the vertical scanning circuit 114 supplies desired control signals required for the operation of each row to the transfer transistor 103, the reset transistor 105, and the selection transistor 107 of each pixel 101. That is, the vertical scanning circuit 114 forms at least a part of the readout circuit for reading out the pixel signals from the pixels 101. In this example, a signal is output from the amplification transistor 106 to the corresponding vertical output line 111 by setting the selection transistor 107 to the ON state. However, it is also possible to omit the selection transistor 107 and directly connect the amplification transistor 106 to the vertical output line 111. In such a case, the ON voltage to set the amplification transistor 106 to the ON state and the OFF voltage to set the amplification transistor 106 to the OFF state may be switched and supplied as the power source voltage to be supplied to the power source voltage line 113. The timing of signal output from the amplification transistor 106 to the vertical output line 111 can be controlled by switching the ON state and the OFF state of the amplification transistor 106.

FIG. 2 is a circuit diagram showing an example of the arrangement of each reset control circuit 115. The reset control circuit 115 includes, as shown in FIG. 2, an inverter 120, p-channel MOS transistors 121, 122, 123, and 124, and n-channel MOS transistors 125 and 126. The p-channel MOS transistor 123 and the n-channel MOS transistor 125 form an input-stage inverter circuit of the buffer circuit. The source of the p-channel MOS transistor 123 is connected to the power source voltage, and the source of the n-channel MOS transistor 125 is connected to the ground voltage. The p-channel MOS transistor 124 and the n-channel MOS transistor 126 form an output-stage inverter circuit of the buffer circuit. The source of the p-channel MOS transistor 123 is connected to the drains of the respective p-channel MOS transistors 121 and 122, and the source of the n-channel MOS transistor 126 is connected to a voltage supply terminal Vin3. The inverter 120 and the p-channel MOS transistors 121 and 122 form a power source switching circuit to switch the high-level voltage supplied to the output-stage inverter circuit of the buffer circuit. Each reset control circuit 115 also includes two input terminals 116' and 117', one output terminal 109', and three voltage supply terminals Vin1, Vin2, and Vin3 to which voltages V1, V2, and V3, respectively, are input. The input terminals 116' and 117' are terminals connected to the control lines 116 and 117, respectively, which connect the vertical scanning circuit 114 to the reset control circuit 115. In the same manner, the output terminal 109' is a terminal connected to the reset gate control line 109.

The output terminal of the input-stage inverter circuit is connected to the gate of the p-channel MOS transistor 124 and the gate of the n-channel MOS transistor 126 which are the input terminals of the output-stage inverter circuit of the buffer circuit. The source of the p-channel MOS transistor 124 is connected to the respective drains of the p-channel MOS transistors 121 and 122, and its drain is connected to the drain of the n-channel MOS transistor 126. The source of the n-channel MOS transistor 126 is connected to the voltage supply terminal Vin3. The connection node of the drain of the p-channel MOS transistor 124 and the drain of the n-channel MOS transistor 126 forms the output terminal 109'.

The input terminal 117' is connected to the gate of the p-channel MOS transistor 121 via the inverter 120 and the gate of the p-channel MOS transistor 122. The source of the p-channel MOS transistor 121 is connected to the voltage supply terminal Vin1. The source of the p-channel MOS transistor 122 is connected to the voltage supply terminal Vin2.

In this manner, the reset control circuit 115 has an arrangement in which one of the voltages V1, V2, and V3 will be output from the input terminal 109' in accordance with the two inputs from the vertical scanning circuit 114 to the input terminal 116' and the input terminal 117'.

Here, the voltage V2 is a potential to set the reset transistor 105 to the ON state and is a potential which can sufficiently reduce the ON resistance so that the potential of the source of the reset transistor 105 will be more or less the same potential as the potential of the drain to which the power source voltage is supplied. The voltage V3 is a potential to set the reset transistor 105 to the OFF state, and is set to be a sufficiently low potential so that the OFF state will be maintained to fall within the operation voltage range of the floating diffusion portion 104 accompanying the signal output. The voltage V1 is a potential which is lower than the voltage V2 but is higher than the voltage V3, and is set to a high ON-resistance state so that the reset transistor 105 will operate in a sub-threshold region. That is, the voltage V1, the voltage V2, and the voltage V3 are set so that the potential will satisfy the relationship of the voltage V3<the voltage V1<the voltage V2. In other words, the voltage V1 is set so as to be a potential that falls between the voltage V2 and the voltage V3.

Figure 3:
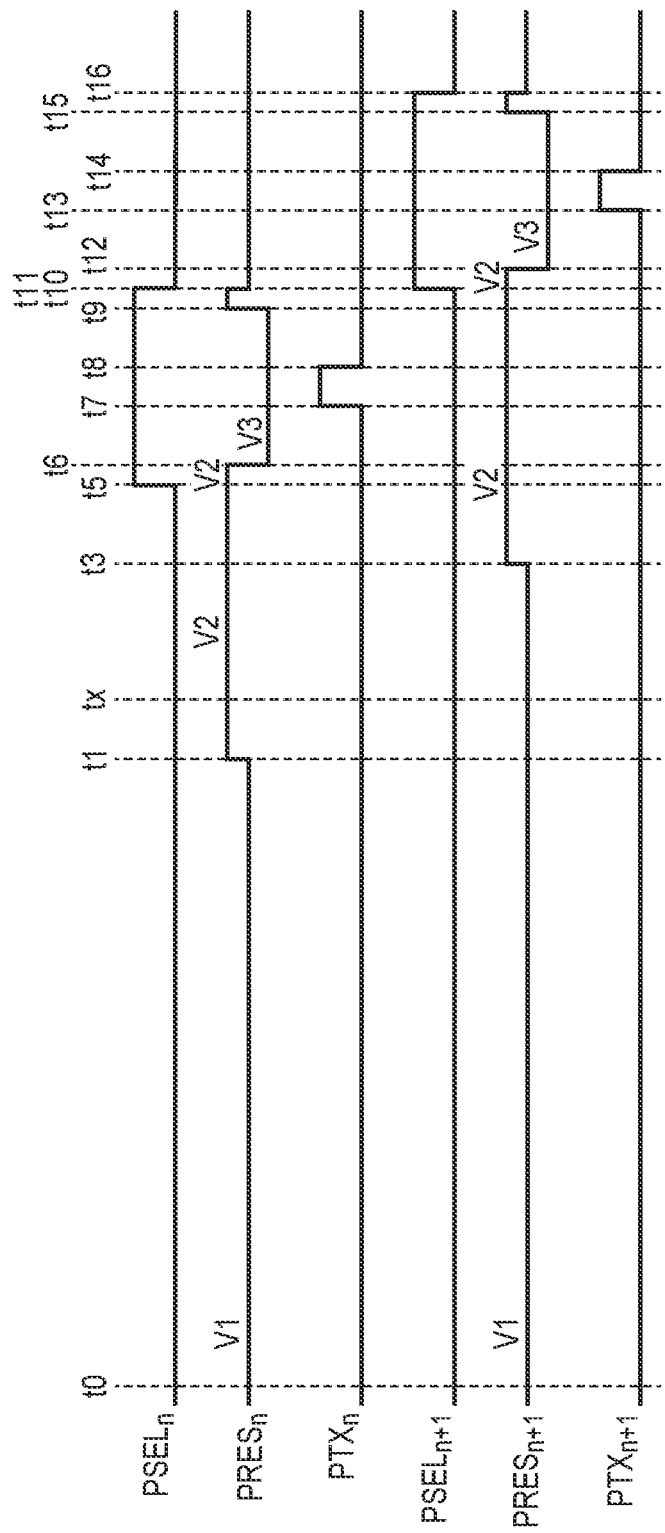
FIG. 3 is a timing chart for explaining a driving method of the photoelectric conversion apparatus of FIG. 1.

The driving method of the photoelectric conversion apparatus 150 according to this embodiment will be described next. FIG. 3 is a timing chart showing the readout operation of two rows of the pixels 101 in the photoelectric conversion apparatus 150 according to this embodiment. In FIG. 3, the period between time t5 and time t10 is a selection period in which the readout circuit selects the pixels 101 belonging to the nth row by setting the selection transistor 107 to the ON state. Between time t7 to time t8 in this selection period, the transfer transistor 103 is set to the ON state, and a signal corresponding to the charges generated in each photoelectric converter 102 is output to the corresponding vertical output line 111. The period of time t11 to time t6 is a selection period in which the readout circuit sets the selection transistor 107 to the ON state to obtain signals from the pixels 101 belonging to the (n+1)th row. Also, in FIG. 3, time t10 and time t11 are the same time. Time t0 is a given time in an accumulation period in which charges are accumulated in the photoelectric converters 102 of the respective pixels 101 belonging to the nth row and those belonging to the (n+1)th row. The accumulation period is a period in which the selection transistor 107 is set to the OFF state to cause each photoelectric converter 102 to accumulate charges. More specifically, it is a period after the selection transistor 107 is set to the OFF state in the selection period before time t0 until charges are transferred to the floating diffusion portion 104 when the selection transistor 107 is set to the ON state at time t7.

In addition, in FIG. 3, a signal $PSEL_n$ represents the signal level of a row selection control line $110_n$ of the nth row, and a signal $PSEL_{n+1}$ represents the signal level of a row selection control line $110_{n+1}$ of the (n+1)th row. The aforementioned selection period is a period in which the vertical scanning circuit 114, forming the readout circuit, causes the selection transistor 107 to shift to the ON state by setting the signal level of the signal PSEL to high level so that each of the pixels 101 arranged in one row among the plurality of pixels 101 will be selected for signal output to the corresponding vertical output line 111. For example, time t5 to time t10 in which the signal level of the signal $PSEL_n$ is set to high level is the selection period of the pixels of belonging to the aforementioned nth row.

In addition, in FIG. 3, a signal $PRES_n$ represents the signal level of a reset gate control line $109_n$ of the nth row, and a signal $PRES_{n+1}$ represents the signal level of a reset gate control line $109_{n+1}$ of the (n+1)th row. Each of the signal levels of the respective voltages V1 to V3 of the signal $PRES_n$ is supplied (applied) to the gate of the reset transistor 105. Here, the gate of a transistor can have a MOS structure including a semiconductor substrate on which the transistor is formed, a gate insulating film, and a gate electrode.

Furthermore, in FIG. 3, a signal $PTX_n$ represents the signal level of a transfer gate control line $108_n$ of the nth row, and a signal $PTX_{n+1}$ represents the signal level of a transfer gate control line $108_{n+1}$ of the (n+1)th row. That is, is in FIG. 3, the accumulation period of the pixels 101 of the nth row is a period from a time, before time t0, at which the transfer transistor 103 is changed to the OFF state in the frame selection period when the signal level of the signal $PTX_n$ is changed to low level, until time t7. In the same manner, the accumulation period of the pixels 101 of the nth row is a period from time t8 until a time at which the transfer transistor 103 is set to the ON state in the next frame selection period. In addition, the accumulation period of the pixels 101 of the (n+1)th row is a period from a time, before time t0, the transfer transistor 103 is set to the OFF state in the frame selection period, until time t11. In the same manner, the accumulation period of the pixels 101 of the (n+1)th row is the period from time t14 until a time at which the transfer transistor 103 is set to the ON state in the next frame selection period.

In the period from the end of a selection period before the selection period starting from time t5 until time t5, the row selection control lines $110_n$ and $110_{n+1}$ and the transfer gate control lines $108_n$ and $108_{n+1}$ are set to a potential of low level by the vertical scanning circuit 114. Also, in the period from the end of the selection period before the selection period which starts at time t5 until time t1, the reset gate control lines $109_n$ and $109_{n+1}$ are set to a potential of the voltage V1 by the vertical scanning circuit 114 via the corresponding reset control circuits 115.

At time t1, the vertical scanning circuit 114 changes, via the reset control circuit 115, the potential of the signal $PRES_n$ of the reset gate control line $109_n$ from the voltage V1 to the voltage V2 which is a potential to set the reset transistor 105 to the ON state. Also, at time t3, the vertical scanning circuit 114 changes, via the reset control circuit 115, the potential of the signal $PRES_{n+1}$ of the reset gate control line $109_{n+1}$ from the voltage V1 to the voltage V2.

In this embodiment, for each row (the nth row will be exemplified in this case), the voltage V1 or the voltage V2 is supplied to the signal $PRES_n$ in the accumulation period starting from the end of the selection period immediately before the selection period that starts from time t5 until time t5, that is, the accumulation period excluding the selection period. Additionally, this accumulation period includes sequentially a period (first period) in which the selection transistor 107 is set to the OFF state and the voltage V1 is supplied from the end of the immediately preceding selection period until time t1, a period (second period) in which the voltage V2 is supplied from time t1 to time t5, and a period (third period) in which the voltage V3 is supplied from time t6 to time t7. Here, as shown in FIG. 3, the voltage V2 may be supplied to the signal $PRES_n$ before a period of time tx to time t5 which is the same length as the period of time t5 to time t10 in which the selection transistor 107 is set to the ON state. In other words, in the accumulation period, after the end of the selection period immediately before the selection period starting from time t5, the length of a period from the start (time t1) of the first supply operation of the voltage V2 to the start (time t5) of the selection period may be longer than the length of the selection period (time t5 to time t10).

In addition, in this embodiment, the length of the period from time t1 at which the supplying of the voltage V2 to the nth row is started to time t5 at which the selection period is started may be the same as the length of the period from time t3 at which the supplying of the voltage V2 to the (n+1)th row is started to time t11 at which the selection period is started. However, the relationship between the length of the period from time t1 to time t5 and the length of the period from time t3 to time t11 is not limited to this. For example, as long as the length of the period from the start of the first supplying operation of the voltage V2 until the start of the selection period in the accumulation period excluding the selection period is longer than the length of the selection period, the length of the period from the start time of the supplying of the voltage V2 until the start time of the selection period may differ for each row.

Next, at time t5, the selection period (readout operation) for obtaining a signal from each of the pixels 101 belonging to the nth row is started. The vertical scanning circuit 114 causes the signal $PSEL_n$ of the row selection control line $110_n$ to change from a potential of low level to a potential of high level to set the selection transistor 107 of each pixel 101 of the nth row to the ON state. As a result, each of the pixels 101 of the nth row is selected. The vertical scanning circuit 114 also sets the signal level of the signal $PRES_n$ to a potential of the voltage V2 by which the potential of the floating diffusion portion 104 is reset via the reset control circuit 115. That is, at time t5 at which a signal output, to the vertical output line 111 serving as the signal line, based on the potential of the floating diffusion portion 104 is started, the voltage V2 is supplied to the gate of the reset transistor 105. In this embodiment, the signal level of the signal $PRES_n$ from time t1 remains at the potential of the voltage V2. A period between time t5 at which signal output to the vertical output line 111 is started and time t7 at which the transfer transistor 103 is set to the ON state includes a period in which the voltage V2 that sets the reset transistor 105 to the ON state is supplied to the gate of the reset transistor 105. In other words, in period from time t5 until time t6 at which the reset transistor 105 is set to the OFF state, the voltage V2 is supplied to the signal $PRES_n$. Also, it may be described that, in the accumulation period, after the signal output to the vertical output line 111 is started at time t5, the voltage V3 which sets the reset transistor 105 to the OFF state at time t6 is supplied to the gate of the reset transistor 105.

Next, at time t6, the vertical scanning circuit 114 sets the reset transistor 105 of each pixel 101 belonging to the nth row to the OFF state by changing the potential of the signal $PRES_n$ of the reset gate control line $109_n$ from the voltage V2 to the voltage V3 via the reset control circuit 115. As a result, the floating diffusion portion 104 is cut off from the reset power source, and the reset operation of the floating diffusion portion 104 is completed.

After the reset operation of the floating diffusion portion 104, in the period of time t6 to time t7, the readout circuit reads out a signal (to be referred to as an "N signal" hereinafter) of a level corresponding to the reset potential of the floating diffusion portion 104. In the period of time t6 to time t7, the selection transistor 107 is set to the ON state time t7 under the control of the vertical scanning circuit 114 which forms the readout circuit, and the source of the amplification transistor 106 is connected to the vertical output line 111 via the selection transistor 107. That is, it is in a state in which a bias current is supplied from the constant current source 112 to the source of the amplification transistor 106 via the vertical output line 111 and the selection transistor 107, thereby forming a source-follower circuit. As a result, a pixel signal (N signal) of a level corresponding to the reset voltage of the floating diffusion portion 104 is amplified by the amplification transistor 106, and the amplified pixel signal is output to the vertical output line 111 via the selection transistor 107. The N signal output to the vertical output line 111 is read out via a column readout circuit (not shown) connected to the vertical output line 111.

Next in the period of time t7 to time t8, the vertical scanning circuit 114 causes the signal $PTX_n$ of the transfer gate control line $108_n$ to change from a potential of low level to a potential of high level to set the transfer transistor 103 of each pixel 101 belonging to the nth row to the ON state. As a result, the photoelectric converter 102 and the floating diffusion portion 104 are connected via the transfer transistor 103, and the signal charges accumulated in the photoelectric converter 102 are transferred to the floating diffusion portion 104 via the transfer transistor 103. At time t8, when the signal $PTX_n$ of the transfer gate control line $108_n$ changes to a potential of low level under the control of the vertical scanning circuit 114, the floating diffusion portion 104 is cut off from the photoelectric converter 102, and the signal charge transfer operation to the floating diffusion portion 104 is completed. The transfer of signal charges to the floating diffusion portion 104 causes, in the floating diffusion portion 104, a voltage change corresponding to the amount of the transferred signal charges by its capacitance. After time t8, the accumulation period of signal charges for the next frame is started in each photoelectric converter 102.

Next, in the period of time t8 to time t9, each pixel signal (to be referred to as an "S signal" hereinafter) corresponding to the level of the potential of the floating diffusion portion 104 to which the signal charges were transferred is read out. In this period as well, the selection transistor 107 is set to the ON state, and the source of the amplification transistor 106 is set to a state in which a bias current is supplied from the constant current source 112 to the source via the selection transistor 107. As a result, a pixel signal (S signal) of a level corresponding to the potential of the floating diffusion portion 104, to which the signal charges were transferred, is amplified by the amplification transistor 106, and the amplified pixel signal is output to the vertical output line 111 via the selection transistor 107. The S signal output to the vertical output line 111 is read out via the column readout circuit (not shown) connected to the vertical output line 111 in the same manner as the N signal.

After the readout of each S signal, in the period of time t9 to time t10, the vertical scanning circuit 114 sets each reset transistor 105 to the ON state by changing the signal $PSEL_n$ of the reset gate control line $109_n$ from the voltage V3 to the voltage V2 via the reset control circuit 115. As a result, the floating diffusion portion 104 is reset to the power source voltage.

Next, at time t10, the vertical scanning circuit 114 sets the selection transistor 107 of each pixel 101 of the nth row by causing the signal $PSEL_n$ of the row selection control line $110_n$ to change from a potential of high level to a potential of low level. As a result, each of the pixels 101 of the nth row is set to an unselected state, and the selection period (readout operation) for obtaining signals from the pixels 101 of the nth row is completed. Also, at time t10, in response to the completion of the selection period of the nth row, the vertical scanning circuit 114 changes the signal level of the signal $PSEL_n$ of the reset gate control line $109_n$ from the voltage V2 to the voltage V1 via the reset control circuit 115.

Additionally, in this embodiment, at time t11 which is the same time as time t10, the vertical scanning circuit 114 causes the signal $PSEL_{n+1}$ of the row selection control line $110_{n+1}$ to change from a potential of low level to a potential of high level. As a result, the selection transistor 107 of each pixel 101 belonging to the (n+1)th row is set to the ON state, and each pixel 101 of the (n+1)th row is set to the selected state. Although time t10 and time t11 are the same time in this embodiment, time t11 may come after time t10.

Subsequently, in the period of time t11 to time t16, the operation of the selection period of the (n+1)th row is performed by the same driving operation as that of the selection period (readout operation) of the nth row in the period of time t5 to time t10. The readout operation of the (n+2)th row and the subsequent rows is performed sequentially by using the same procedure.

From the study conducted by the inventor, it has become evident that the higher the voltage applied to the gate of the reset transistor 105 is, that is, the lower the ON resistance of the reset transistor 105 is, the higher the ratio at which the charges that have overflowed from the saturated photoelectric converter 102 to the floating diffusion portion 104 are discharged to the drain. That is, a high blooming-suppression capability became evident from the study. In the Japanese Patent Laid-Open No. 2016-178408, in the accumulation period, a potential of a voltage that falls between a voltage to set the reset transistor 105 to the ON state and a voltage to set the reset transistor to the OFF state is supplied to the gate of the reset transistor 105 after the selection period. In a case in which the ON resistance of the reset transistor 105 to the supplied voltages is increased higher than expected due to variation of the reset transistor 105 or the like, the potential of the floating diffusion portion 104 may not become sufficiently high, and image quality degradation due to blooming may not be suppressed. In contrast, in this embodiment, in the accumulation period excluding the selection period, the voltage V2 which sets the reset transistor 105 to the ON state is supplied. This increases the blooming suppression capability of the pixels 101 of the nth row in the period of time t1 to time t5, and the blooming suppression capability of the pixels 101 of the (n+1)th row in the period of time t3 to time t11 is also increased in the same manner.

Figure 4:
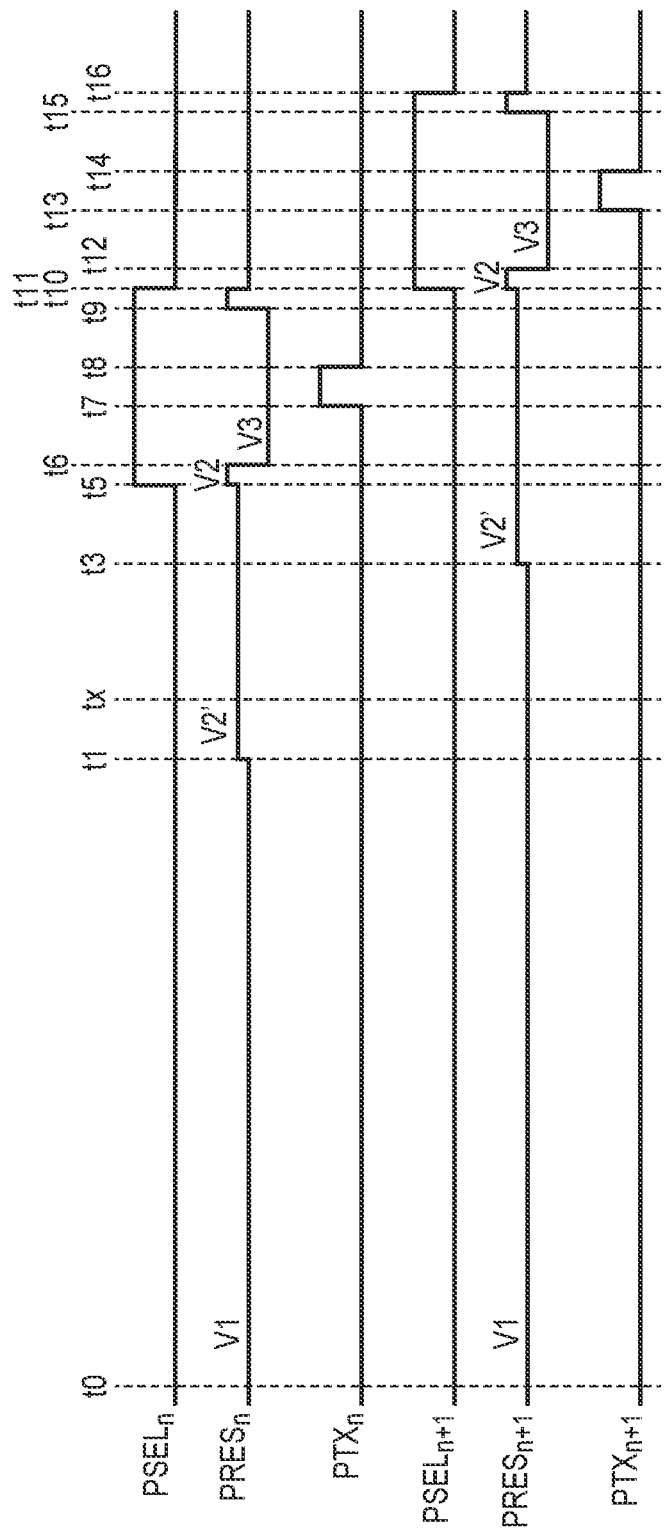
FIG. 4 is a timing chart for explaining a modification of the driving method of the photoelectric conversion apparatus of FIG. 1.

In the arrangement shown in FIG. 3, in the period of time t1 to time t5, the voltage V2 to set the reset transistor to the ON state is supplied to the signal $PRES_n$ of the reset gate control line $109_n$. However, the voltage to be supplied to the signal $PRES_n$ in this period is not limited to this. For example, consider a case in which four types of voltages can be supplied to the signal $PRES_n$ as shown in FIG. 4. The voltages V1, V2, and V3 supplied to the signal $PRES_n$ are the same potentials as those described in FIG. 3. A voltage VT is a voltage that falls between the voltage V1 and the voltage V2 which sets the reset transistor 105 to the ON state. In this case, the accumulation period includes sequentially a period (first period) in which the selection transistor 107 is set to the OFF state and the voltage V1 is supplied from the end of the previous selection period until time t1, a period (second period) in which the voltage VT is supplied from time t1 to time t5, and a period (third period) in which the voltage V3 is supplied from time t6 to time t7. Furthermore, between the period in which the voltage V2' is supplied from time t1 to time t5 and the period in which the voltage V3 is supplied from time t6 to time t7, the voltage V2 which sets the reset transistor 105 to the ON state is supplied to the gate of the reset transistor 105. From the viewpoint of the ON resistance as described above, the higher the potential of the voltage V2' which decreases the ON resistance is, the larger the blooming suppression effect is. The voltage V2' is normally a potential lower than the voltage V2, but the voltage V2' may be a potential higher than the voltage V2. Examples of the photoelectric conversion apparatus 150 and the reset control circuit 115 supporting an arrangement in which the voltages V1, V2, V2', and V3 of 4 types of potentials are supplied to the signal $PRES_n$ are shown in FIGS. 5 and 6, respectively.

Figure 5:
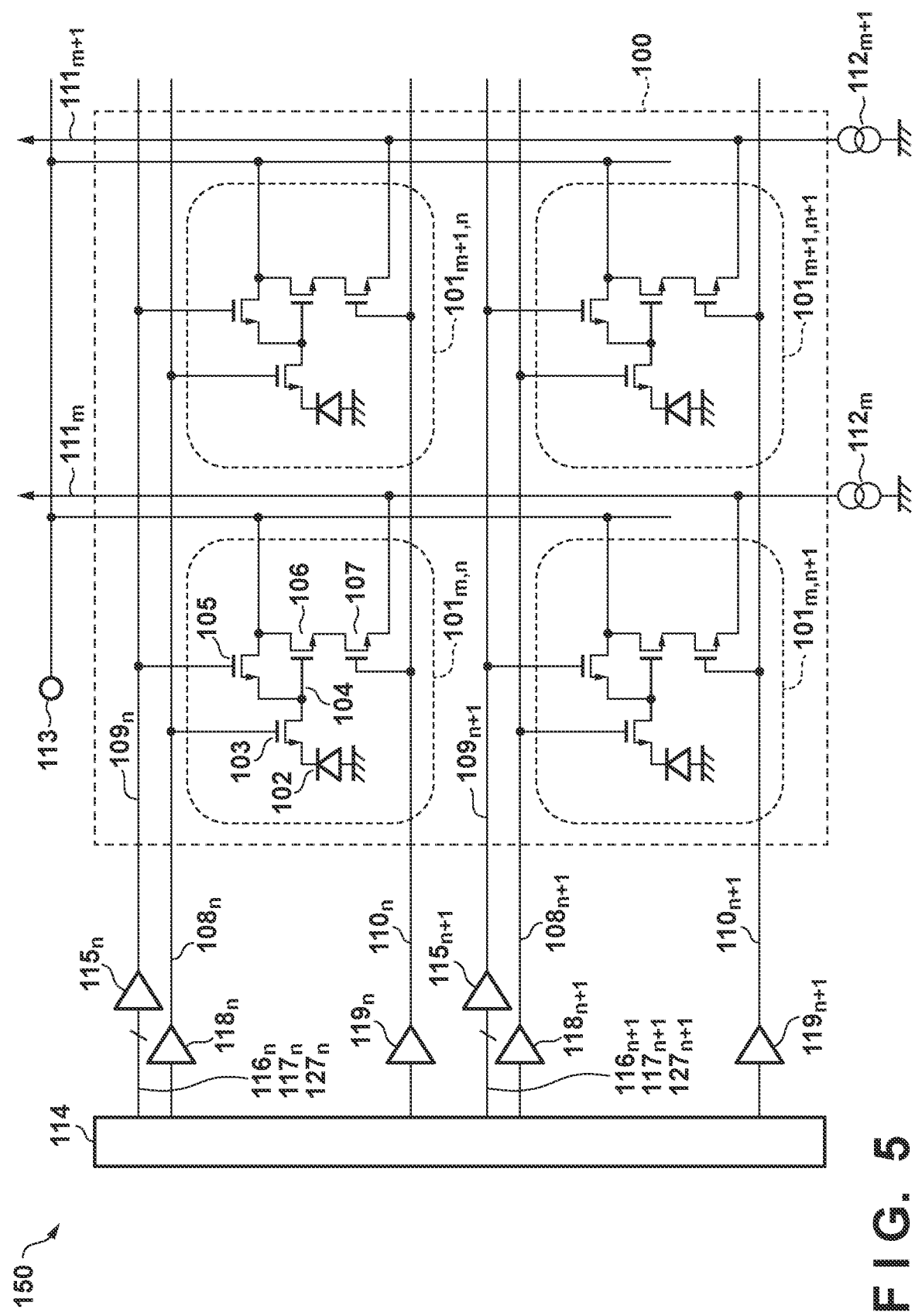
FIG. 5 is a circuit diagram showing a modification of the arrangement of pixels of the photoelectric conversion apparatus of FIG. 1.
Figure 6:
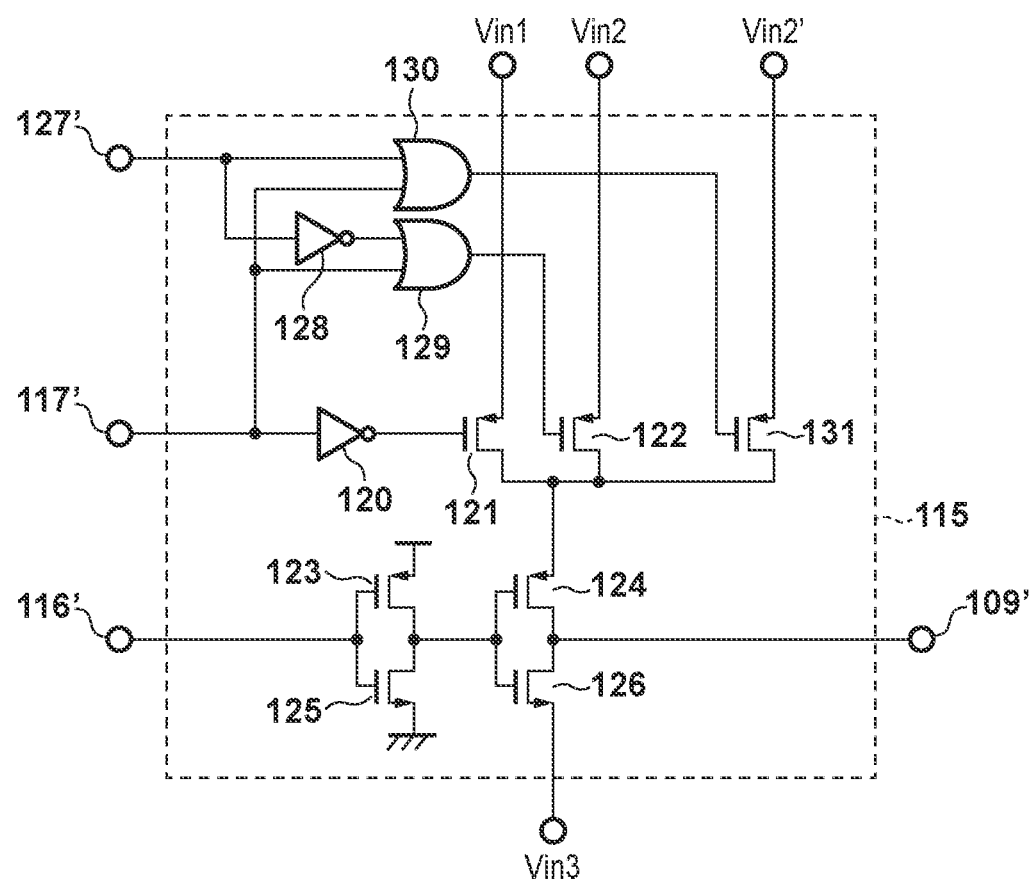
FIG. 6 is a circuit diagram showing a modification of the arrangement of the reset control circuit of the pixel of the photoelectric conversion apparatus of FIG. 1.

In contrast to the photoelectric conversion apparatus 150 shown in FIG. 1, a control line 127 that connects the vertical scanning circuit 114 to the reset control circuit 115 has been added to the photoelectric conversion apparatus 150 shown in FIG. 5. Also, in contrast to the reset control circuit 115 shown in FIG. 2, an input terminal 127', an inverter 128, AND circuits 129 and 130, a p-channel MOS transistor 131, and a voltage supply terminal Vin2' to which the voltage V2' is input have been added to the reset control circuit 115 shown in FIG. 6. In the arrangement shown in FIG. 6, when the input terminal 117' is set to low level and the input terminal 127' is set to high level, the voltage V2 is the high level signal supplied to the output-stage inverter circuit of the buffer circuit. When the input terminal 117' is set to low level and the input terminal 127' is set to low level, the voltage V2' is the high level signal supplied to the output-stage inverter circuit of the buffer circuit. In the arrangement shown in FIG. 6, the control line 127' is the terminal connected to the control line 127 that connects the vertical scanning circuit 114 to each reset control circuit 115 shown in FIG. 5.

Here, when the reliability of the durability of the electric field surrounding the gate electrode of the reset transistor 105 is considered, there is a possibility that the reliability of the reset transistor 105 will degrade if the voltage supplied to the reset gate control line 109 is set to the voltage V2 or the voltage VT for a long period. Also, in FIGS. 3 and 4, time t1 and time t3 at which the supply of the voltage V2 or VT is started in the nth row and the (n+1)th row, respectively, to discharge the blooming charges that overflow during the accumulation period may be set sufficiently before time t5 and time t11 at which the selection periods of the nth row and the (n+1)th row, respectively, are started. By setting the time t1 and time t3 to be sufficiently before time t5 and time t11, a higher blooming suppression capability can be obtained.

Figure 7:
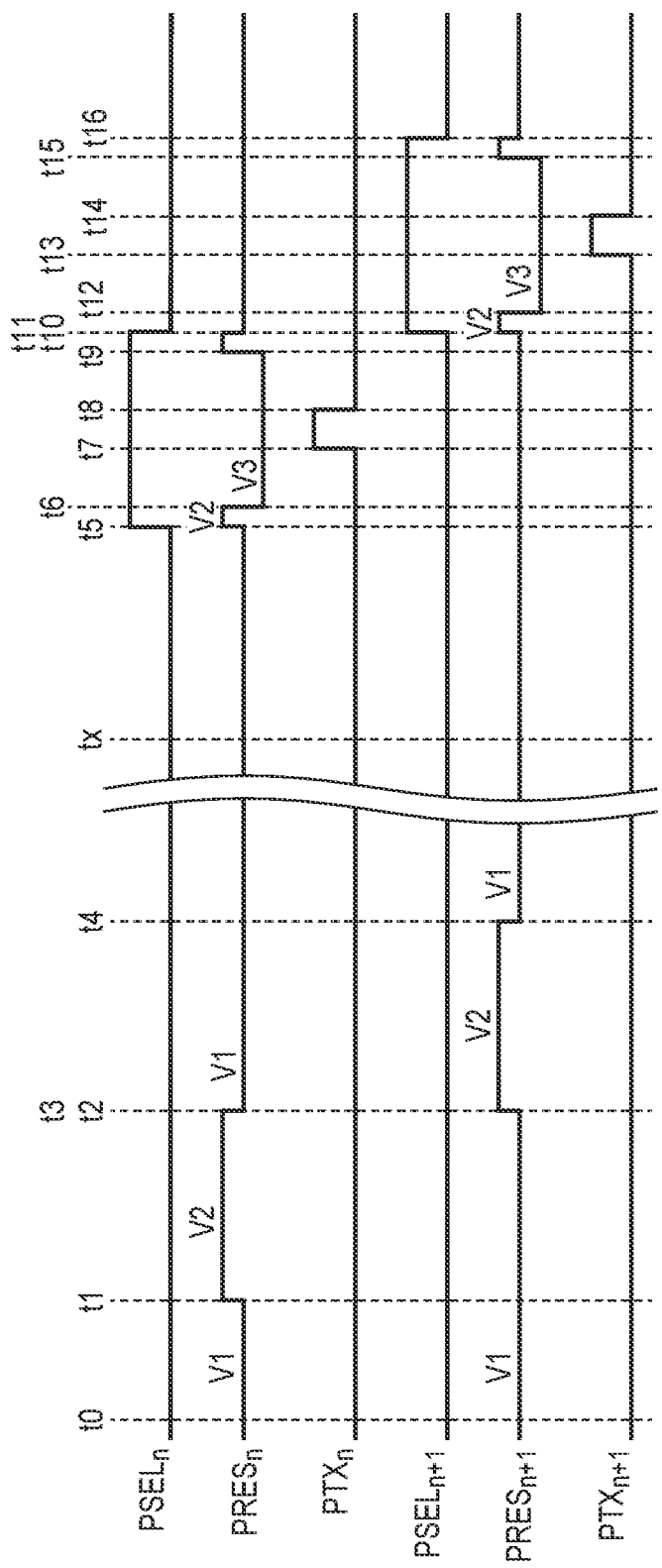
FIG. 7 is a timing chart for explaining the driving method of the photoelectric conversion apparatus of FIG. 1.

Accordingly, the driving of the photoelectric conversion apparatus 150 may be controlled at the timings shown in FIG. 7. In FIGS. 3 and 4, the length of the period from time t1 at which the potential of the reset gate control line $109_n$ is changed from the voltage V1 to the voltage V2 until time t5 at which the selection period is started can be about a length that barely exceeds the length of selection period (time t5 to time t10). On the other hand, in the timing chart shown in FIG. 7, the length of the period from time t1 to time t5 is set to a time that sufficiently exceeds the length of the selection period (time t5 to time t10). Also, in the timing chart shown in FIG. 7, the potential of the signal $PRES_n$ of the reset gate control line $109_n$ changes to the voltage V2 at time t1, and returns to the voltage V1 at time t2. That is, in the timing chart of FIG. 7, for each row (the nth row will be exemplified in this case), the accumulation period includes a period (first period) in which the voltage V1 is supplied from the end of the previous selection period of the selection period which starts at time t5 to time t1, a period (second period) in which the voltage V2 is supplied, a period (third period) in which the voltage V3 is supplied from time t6 to time t7, and a fourth period in which the voltage V1 is supplied from time t2 to time t5. In addition, the voltage V2 is supplied to the gate of the reset transistor 105 at time t5 at which the signal output, to the vertical output line 111 which is the signal line, based on the potential of the floating diffusion portion 104 is started. This supplying of the voltage V2 continues until time t6 at which the reset transistor 105 is set to the OFF state. As a result, it is possible to reduce the length of time in which the voltage V2 which has a higher potential is supplied than in the cases shown in the timing charts of FIGS. 3 and 4. For example, the period of time t1 to time t2 in which the voltage V2 is supplied may be included in the first half of the accumulation period excluding the selection period. In this case, the voltage V1 may continue to be supplied during the period (fourth period) of time t2 to time t5. Also, for example, after the voltage V2 has been supplied, the voltage V1 and the voltage V2 may be repetitively supplied in the period of time t2 to time t5. As described above, after the end of the selection period, the length of the period from the start of the first supply operation of the voltage V2 to the start of the selection period may be longer than the length of the selection period. Also, although the voltage V2 is supplied to the signal $PRES_n$ during time t1 to time t2 in FIG. 7, the voltage VT may be supplied to the signal $PRES_n$ by using the reset control circuit 115 and the pixels of the photoelectric conversion apparatus 150 shown in FIGS. 5 and 6. Additionally, for example, as shown in the timing charts of FIGS. 3, 4, and 7, in the accumulation period, the period in which the voltage V2 is supplied to the gate of the reset transistor 105 may be shorter than the period in which the voltage V1 is supplied. Furthermore, for example, in the accumulation period, a period from the start of the supply operation of the voltage V1 to the gate of the reset transistor 105 until the signal output to the vertical output line 111 as the signal line is started (a period from the time at which the voltage V1 is first supplied after the end of the previous selection period to time t5) may be longer than the period from time t5 at which the signal output to the vertical output line 111 is started until the start (time t6) of the period in which the voltage V3 is supplied.

In addition, in the timing chart shown in FIG. 7, the potential of the signal $PRES_{n+1}$ of the reset gate control line $109_{n+1}$ is set to the voltage V2 at time t3 and returns to the voltage V1 at time t4. Although time t2 and time t3 are shown to be the same time in the relationship between the nth row and the (n+1)th row, time t2 and time t3 may be at different times. In such a case, the potential of the signal $PRES_{n+1}$ of the reset gate control line $109_{n+1}$ may be set to the voltage V2 before the potential of the signal $PRES_n$ of the reset gate control line $109_n$ is changed to the voltage V1. Furthermore, the potential of the signal $PRES_{n+1}$ of the reset gate control line $109_{n+1}$ may be set to the voltage V2 after the potential of the signal $PRES_n$ of the reset gate control line $109_n$ is changed to the voltage V1.

Figure 8:
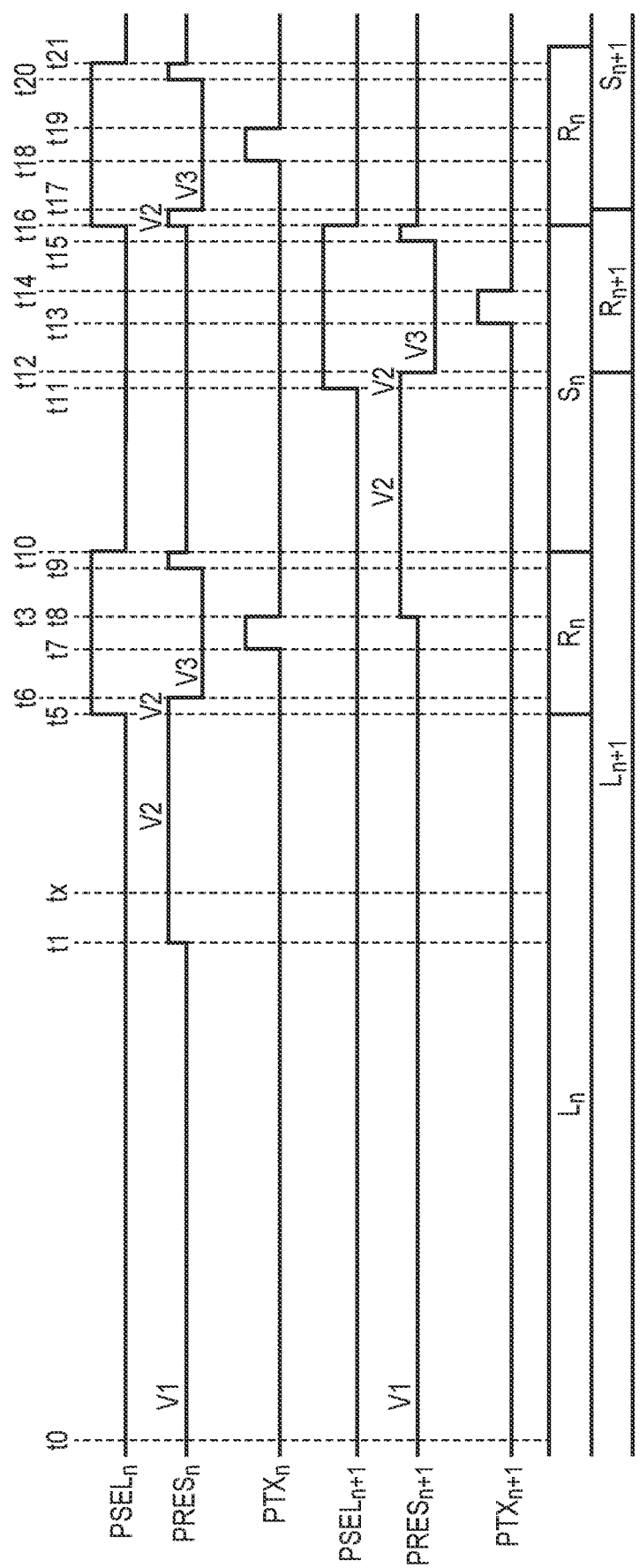
FIG. 8 is a timing chart for explaining a driving method of a photoelectric conversion apparatus of FIG. 1.

A driving method of a photoelectric conversion apparatus according to the second embodiment of the present invention will be described with reference to FIG. 8. FIG. 8 is a timing chart for explaining the driving method of a photoelectric conversion apparatus 150 according to the second embodiment of the present invention. The arrangements of the photoelectric conversion apparatus 150 and a reset control circuit 115 may be the same as those in the above-described first embodiment, and thus a description will be omitted.

In FIG. 8, a period $L_n$ is a long accumulation period (exposure period) for pixels of the nth row, a period $R_n$ is a selection period in which pixel signals are readout from pixels 101 of the nth row, and a period $S_n$ is a short accumulation period (exposure period) for the pixels of the nth row. Also, a period $L_{n+1}$ is a long accumulation period (exposure period) for pixels of the (n+1)th row, a period $R_{n+1}$ is a selection period in which pixel signals are readout from pixels 101 of the (n+1)th row, and a period $S_{n+1}$ is a short accumulation period (exposure period) for the pixels of the (n+1)th row. In this embodiment, the length of the accumulation period is controlled by a transfer transistor 103 for each frame in this manner. More specifically, a signal corresponding to charges generated in a photoelectric converter 102 of each of the plurality of pixels 101 during the long accumulation period and a signal corresponding to the charges generated in each photoelectric converter 102 during the accumulation period which is shorter than the long accumulation period are repetitively output. By combining each signal obtained in the long accumulation period and each signal obtained in the short accumulation period, the dynamic range of the obtained image can be expanded.

Here, in a strict sense, the start time of the exposure period (accumulation period) is, for example in the case of the short exposure period $S_n$, time t8 at which the transfer of signal charges ends, and the end time of the exposure period (accumulation period) is time t18 at which the transfer of signal charges starts. In FIG. 8, in order to simplifying the drawing, the accumulation period (exposure period) and the selection period have been illustrated without any overlap.

In FIG. 8, the same operations as those performed in the period of time t0 to time t16 that were described with reference to FIG. 3 will be performed in the period from time t0 to time t16. In addition, the period from time t16 to time t21 is the selection period of the pixels of the nth row after the short exposure period, and the same operations as those performed in the period from time t5 to time t10 will be performed in this period.

In this embodiment, during the period from time t10 to time t12, for the nth row and the (n+1)th row which are adjacent to each other, the short exposure period of the pixels arranged in the nth row on one hand and the long exposure period of the pixels arranged in the (n+1)th row on the other hand partially overlap each other. However, since the potential of the reset gate control line 109 of the (n+1)th row is set to a voltage V4 in this overlapping timing, the pixels 101 of the (n+1)th row have a high blooming suppression capability. As a result, in the short exposure period of the pixels 101 of the nth row, even in a case in which charges overflow from the pixels 101 during the long exposure period of the (n+1)th row, the ratio at which the overflow charges are discharged to the drain is increased, and thus the influence on the pixel signals of the pixels 101 of the nth row is suppressed. Therefore, it is possible to suppress the degradation of the image quality of the image obtained by the photoelectric conversion apparatus 150.

As application examples of the photoelectric conversion apparatus 150 according to the above-described embodiments, an electronic equipment such as a camera or a smartphone incorporating the photoelectric conversion apparatus 150 as an image sensing apparatus and a transportation equipment such as an automobile, will be exemplified hereinafter. Here, the concept of a camera includes not only an apparatus whose main purpose is image capturing but also an apparatus (for example, a personal computer, mobile terminal such as a tablet, etc.) that auxiliarly has an image capturing function.

Figure 9:
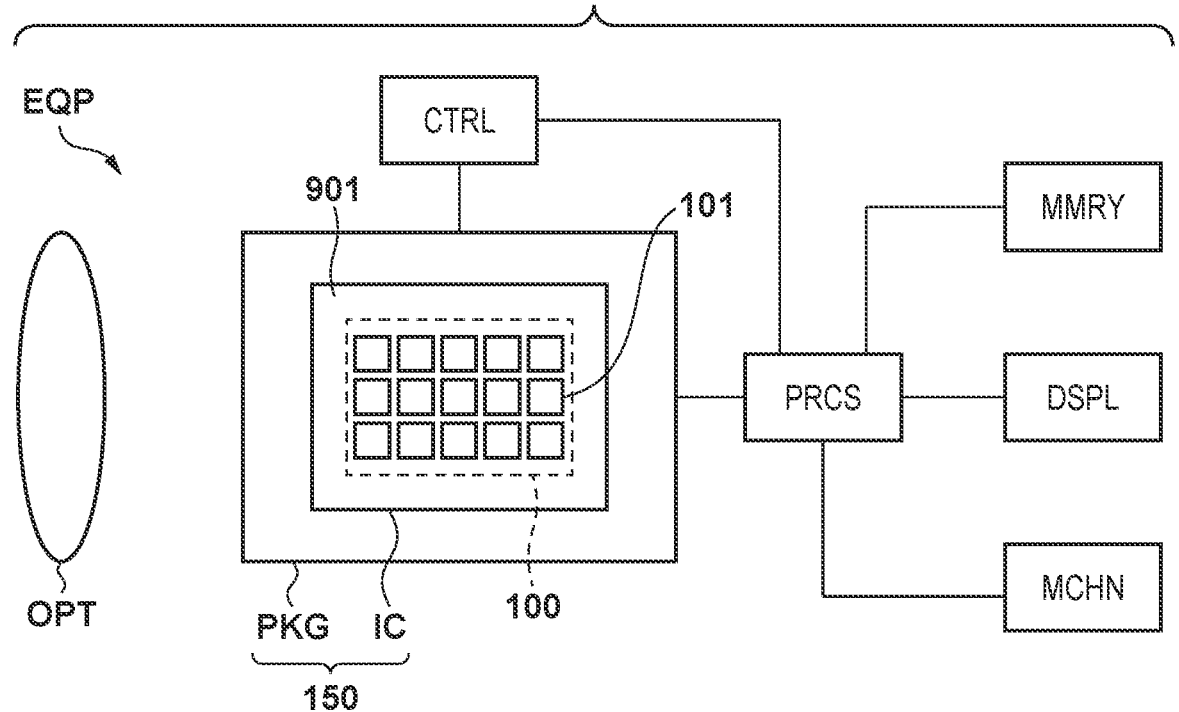
FIG. 9 is a view showing an example of the arrangement of an electronic device that incorporates the photoelectric conversion apparatus of FIG. 1.

FIG. 9 is a schematic view of an equipment EQP incorporating the photoelectric conversion apparatus 150. An electronic equipment (an information equipment) such as a camera or a smartphone, a transportation equipment such as an automobile or an airplane, or the like is an example of the equipment EQP. The photoelectric conversion apparatus 150 can include, other than a semiconductor device IC that includes a semiconductor chip on which the image sensing region 100 with the array of the pixels 101 has been arranged, a package PKG that contains the semiconductor device IC. The package PKG can include a base on which the semiconductor device IC is fixed and a lid member made of glass or the like which faces the semiconductor device IC, and connection members such as a bump and a bonding wire that connect a terminal arranged in the base to a terminal arranged in the semiconductor device IC. The equipment EQP can further include at least one of an optical system OPT, a control apparatus CTRL, a processing apparatus PRCS, a display apparatus DSPL, and a memory apparatus MMRY. The optical system OPT forms an image on the photoelectric conversion apparatus 150 and is formed from, for example, a lens, a shutter, and a mirror. The control apparatus CTRL controls the operation of the photoelectric conversion apparatus 150 and is a semiconductor device such as an ASIC. The processing apparatus PRCS processes signals output from the photoelectric conversion apparatus 150 and is a semiconductor device such as a CPU or an ASIC for forming an AFE (Analog Front End) or a DFE (Digital Front End). The display apparatus DSPL is an EL display apparatus or a liquid crystal display apparatus that displays information (image) acquired by the photoelectric conversion apparatus 150. The memory apparatus MMRY is a magnetic device or a semiconductor device for storing information (image) acquired by the photoelectric conversion apparatus 150. The memory apparatus MMRY is a volatile memory such as an SRAM, DRAM, or the like or a nonvolatile memory such as a flash memory, a hard disk drive, or the like. A mechanical apparatus MCHN includes a driving apparatus or propulsion apparatus such as a motor, an engine, or the like. The mechanical apparatus MCHN in the camera can drive the components of the optical system OPT for zooming, focusing, and shutter operations. In the equipment EQP, signals output from the photoelectric conversion apparatus 150 are displayed on the display apparatus DSPL and are transmitted externally by a communication apparatus (not shown) included in the equipment EQP. Hence, the equipment EQP may further include the memory apparatus MMRY and the processing apparatus PRCS that are separate from a storage circuit unit and a calculation circuit unit included in a control/signal processing circuit 901 provided in the photoelectric conversion apparatus 150.

Figure 10A:
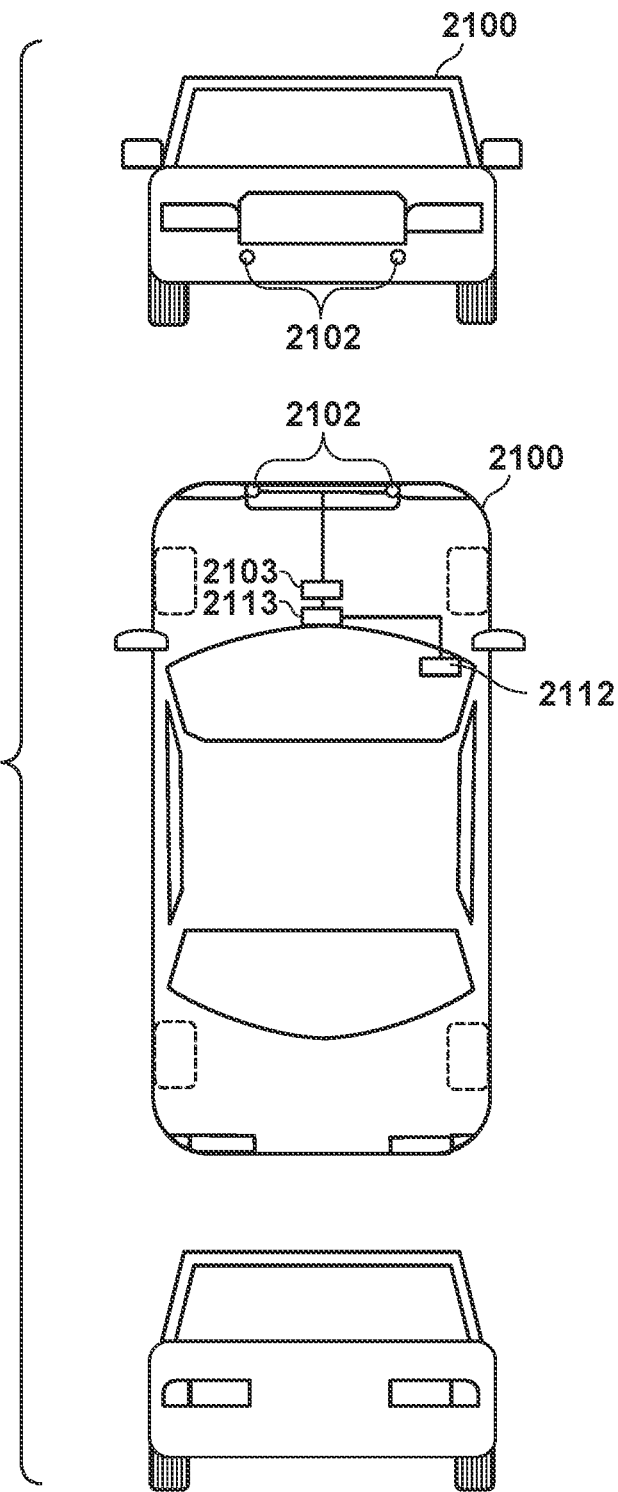
FIGS. 10A and 10B are views showing examples of the arrangement of a transportation equipment in which the photoelectric conversion apparatus of FIG. 1 has been mounted.

As described above, the photoelectric conversion apparatus 150 according to the embodiments can obtain an image in which the generation of blooming has been suppressed or an image with a wide dynamic range. Hence, a camera incorporating the photoelectric conversion apparatus 150 is applicable as a monitoring camera, an onboard camera mounted in a transportation equipment such as an automobile or a railroad car, or the like. A case in which the camera incorporating the photoelectric conversion apparatus 150 is applied to a transportation equipment will be exemplified here. A transportation equipment 2100 is, for example, an automobile including an onboard camera 2101 shown in FIGS. 10A and 10B. FIG. 10A schematically shows the outer appearance and the main internal structure of the transportation equipment 2100. The transportation equipment 2100 includes photoelectric conversion apparatuses 2102, an image sensing system ASIC (Application Specific Integrated Circuit) 2103, a warning apparatus 2112, and a control apparatus 2113.

The above-described photoelectric conversion apparatus 150 is used in each photoelectric conversion apparatus 2102. The warning apparatus 2112 warns a driver when it receives an abnormality signal from an image-sensing system, a vehicle sensor, a control unit, or the like. The control apparatus 2113 comprehensively controls the operations of the image sensing system, the vehicle sensor, the control unit, and the like. Note that the transportation equipment 2100 need not include the control apparatus 2113. In this case, the image sensing system, the vehicle sensor, and the control unit each can individually include a communication interface and exchange control signals via a communication network (for example, CAN standards).

Figure 10B:
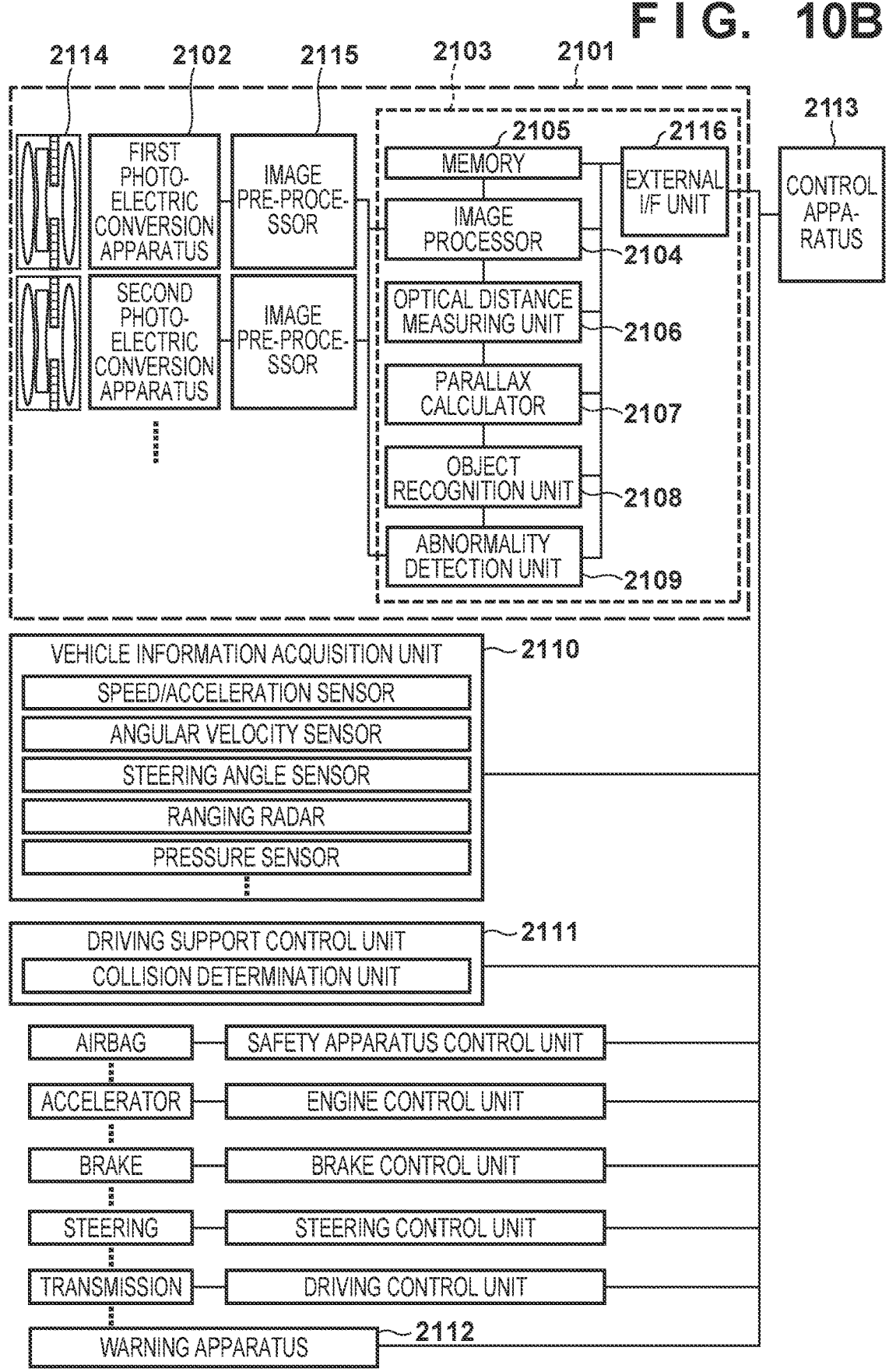

FIG. 10B is a block diagram showing the system arrangement of the transportation equipment 2100. The transportation equipment 2100 includes the first photoelectric conversion apparatus 2102 and the second photoelectric conversion apparatus 2102. That is, the onboard camera according to this embodiment is a stereo camera. An object image is formed by an optical unit 2114 on each photoelectric conversion apparatus 2102. An image signal output from each photoelectric conversion apparatus 2102 is processed by an image pre-processor 2115 and transmitted to the image sensing system ASIC 2103. The image pre-processor 2115 performs processing such as S–N calculation and synchronization signal addition. The above-described signal processor 902 corresponds to at least a part of the image pre-processor 2115 and the image sensing system ASIC 2103.

The image sensing system ASIC 2103 includes an image processor 2104, a memory 2105, an optical distance measuring unit 2106, a parallax calculator 2107, an object recognition unit 2108, an abnormality detection unit 2109, and an external interface (I/F) unit 2116. The image processor 2104 generates an image signal by processing signals output from the pixels of each photoelectric conversion apparatus 2102. The image processor 2104 also performs correction of image signals and interpolation of abnormal pixels. The memory 2105 temporarily holds the image signal. The memory 2105 may also store the position of a known abnormal pixel in the photoelectric conversion apparatus 2102. The optical distance measuring unit 2106 uses the image signal to perform focusing or distance measurement of an object. The parallax calculator 2107 performs object collation (stereo matching) of a parallax image. The object recognition unit 2108 analyzes image signals to recognize objects such as a transportation equipment, a person, a road sign, a road, and the like. The abnormality detection unit 2109 detects the fault or an error operation of the photoelectric conversion apparatus 2102. When a fault or an error operation has been detected, the abnormality detection unit 2109 transmits a signal indicating the detection of an abnormality to the control apparatus 2113. The external I/F unit 2116 mediates the exchange of information between the units of the image sensing system ASIC 2103 and the control apparatus 2113 or the various kinds of control units.

The transportation equipment 2100 includes a vehicle information acquisition unit 2110 and a driving support unit 2111. The vehicle information acquisition unit 2110 includes vehicle sensors such as a speed/acceleration sensor, an angular velocity sensor, a steering angle sensor, a ranging radar, and a pressure sensor.

The driving support unit 2111 includes a collision determination unit. The collision determination unit determines whether there is a possibility of collision with an object based on the pieces of information from the optical distance measuring unit 2106, the parallax calculator 2107, and the object recognition unit 2108. The optical distance measuring unit 2106 and the parallax calculator 2107 are examples of distance information acquisition units that acquire distance information of a target object. That is, distance information is pieces of information related to the parallax, the defocus amount, the distance to the target object, and the like. The collision determination unit may use one of these pieces of distance information to determine the possibility of a collision. Each distance information acquisition unit may be implemented by dedicated hardware or a software module.

An example in which the driving support unit 2111 controls the transportation equipment 2100 so as to avoid a collision with another object has been described. However, the present invention is also applicable to a case in which automatic driving control for following another vehicle or automatic driving control for preventing the vehicle from drifting out of the lane is performed.

The transportation equipment 2100 also includes mechanical apparatuses, which are used for movement or for supporting the movement, such as an air bag, an accelerator, a brake, a steering wheel, a transmission, an engine, a motor, wheels, propellers, and the like. The transportation equipment 2100 also includes control units for these mechanical apparatuses. Each control unit controls a corresponding mechanical apparatus based on a control signal of the control apparatus 2113.

The image sensing system used in each embodiment is applicable not only to an automobile and a railroad car but also to, for example, a transportation equipment such as a ship, an airplane, or an industrial robot. In addition, the image sensing system is applicable not only to a transportation equipment but also to an equipment that uses object recognition widely such as an ITS (Intelligent Transportation System).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-216550, filed Nov. 9, 2017, which is hereby incorporated by reference wherein in its entirety.

What is claimed is:

1. A photoelectric conversion apparatus that includes a plurality of pixels and a readout circuit, wherein
   each of the plurality of pixels comprises a photoelectric converter, a floating diffusion portion, a transfer transistor configured to transfer charges generated in the photoelectric converter to the floating diffusion portion, a reset transistor configured to reset a potential of the floating diffusion portion, and an amplification transistor configured to output a signal based on the potential of the floating diffusion portion to a signal line,
   an accumulation period in which charges are accumulated in the photoelectric converter by setting the transfer transistor to an OFF state includes, sequentially, a first period in which a first voltage is supplied to a gate of the reset transistor, a second period in which a second voltage is supplied to the gate of the reset transistor, and a third period in which a third voltage to set the reset transistor to the OFF state is supplied to the gate of the reset transistor,
   the first voltage is a voltage that falls between the second voltage and the third voltage,
   the supplying of the second voltage in the second period is started before the signal is output from the amplification transistor to the signal line, and
   a time in which the second voltage is supplied in the second period is longer than a time in which the third voltage is supplied in the third period.

2. The apparatus according to claim 1, wherein the second voltage is a voltage to set the reset transistor to an ON state.

3. The apparatus according to claim 1, wherein the second voltage is supplied to the gate of the reset transistor at the time at which the output of the signal to the signal line is started.

4. The apparatus according to claim 1, wherein a fourth voltage to set the reset transistor to an ON state is supplied to the gate of the reset transistor in a period between the second period and the third period, and
   the second voltage is a voltage that falls between the fourth voltage and the first voltage.

5. The apparatus according to claim 1, wherein a voltage to set the reset transistor to an ON state is supplied to the gate of the reset transistor in a period between the time at which the output of the signal to the signal line is started and time at which the transfer transistor is set to the ON state.

6. The apparatus according to claim 1, wherein in the accumulation period, the third voltage to set the reset transistor to the OFF state is supplied to the gate of the reset transistor after the output of the signal to the signal line is started.

7. The apparatus according to claim 1, wherein a fourth period is included in a period between the second period and the time at which the output of the signal to the signal line is started, and the first voltage is supplied to the gate of the reset transistor in the fourth period.

8. The apparatus according to claim 7, wherein the first voltage and the second voltage are repetitively supplied to the gate of the reset transistor in the fourth period.

9. The apparatus according to claim 1, wherein the second period is a period in which the second voltage is first supplied to the gate of the reset transistor after the end of the output of the signal to the signal line.

10. The apparatus according to claim 1, wherein the second period is included in a first half of the accumulation period.

11. The apparatus according to claim 1, wherein in the accumulation period, the period in which the second voltage is supplied to the gate of the reset transistor is shorter than the period in which the first voltage is supplied to the gate of the reset transistor.

12. The apparatus according to claim 1, wherein a period from the start of the first period until the time at which the output of the signal to the signal line is started is longer than a period from the time at which the output of the signal to the signal line is started until the start of the third period.

13. The apparatus according to claim 1, wherein the length of the accumulation period is controlled by the transfer transistor, and a signal corresponding to the charges generated in the photoelectric converter of each of the plurality of pixels in a first accumulation period and a signal corresponding to charges generated in the photoelectric converter of each of the plurality of pixels in a second accumulation period which is shorter than the first accumulation period are repetitively output.

14. The apparatus according to claim 13, wherein in pixels which are arranged in adjacent rows among the plurality of pixels, the first accumulation period of pixels in one row and the second accumulation period of pixels in another row at least partially overlap.

15. The apparatus according to claim 1, further comprising:

a selection transistor configured to connect the amplification transistor and the signal line, wherein the signal is output to the signal line from the amplification transistor by setting the selection transistor to an ON state.

16. An equipment comprising:

a photoelectric conversion apparatus defined in claim 1; and a processing apparatus configured to process a signal output from the photoelectric conversion apparatus.

17. An equipment comprising:

a photoelectric conversion apparatus defined in claim 1;

a mechanical apparatus; and a control apparatus, wherein the control apparatus is configured to control the mechanical apparatus based on information obtained from the photoelectric conversion apparatus.

18. A method of driving a photoelectric conversion apparatus that includes a plurality of pixels, wherein each of the plurality of pixels comprises a photoelectric converter, a floating diffusion portion, a transfer transistor configured to transfer charges generated in the photoelectric converter to the floating diffusion portion, a reset transistor configured to reset a potential of the floating diffusion portion, and an amplification transistor configured to output a signal based on the potential of the floating diffusion portion to a signal line, an accumulation period in which charges are accumulated in the photoelectric converter by setting the transfer transistor to an OFF state includes, sequentially, a first period in which a first voltage is supplied to a gate of the reset transistor, a second period in which a second voltage is supplied to the gate of the reset transistor, and a third period in which a third voltage to set the reset transistor to the OFF state is supplied to the gate of the reset transistor, the first voltage is a voltage that falls between the second voltage and the third voltage, the supplying of the second voltage in the second period is started before the signal is output from the amplification transistor to the signal line, and a time in which the second voltage is supplied in the second period is longer than a time in which the third voltage is supplied in the third period.

\* \* \* \* \*